US005728825A

United States Patent [19]
Wong

[11] Patent Number: 5,728,825
[45] Date of Patent: Mar. 17, 1998

[54] FAST HYDRATING DUST-FREE XANTHAN GUM

[75] Inventor: Philip Wong, Kendall Park, N.J.

[73] Assignee: Rhone-Poulenc Inc., Cranbury, N.J.

[21] Appl. No.: 579,030

[22] Filed: Dec. 18, 1995

[51] Int. Cl.⁶ .......................... G07G 17/00; C08B 37/00
[52] U.S. Cl. .................. 536/114; 514/54; 514/529; 514/547; 514/549; 514/558; 514/560; 424/49; 127/29; 106/205; 106/208
[58] Field of Search .................. 536/114; 514/54, 514/529, 547, 549, 558, 560; 424/49; 127/29; 106/205, 208

[56] References Cited

U.S. PATENT DOCUMENTS

| | | | |
|---|---|---|---|
| 3,146,200 | 8/1964 | Goldstein et al. | 252/8.5 |
| 3,801,502 | 4/1974 | Hitzman | 252/8.55 |
| 3,912,713 | 10/1975 | Boonstra et al. | 260/209 |
| 4,041,234 | 8/1977 | Maske | 536/114 |
| 4,057,509 | 11/1977 | Costanza et al. | 252/316 |
| 4,218,262 | 8/1980 | Warren | 106/206 |
| 4,254,257 | 3/1981 | Schroeck | 536/52 |
| 4,260,741 | 4/1981 | Schuppner, Jr. | 536/114 |
| 4,269,974 | 5/1981 | Wintersdorff | 536/114 |
| 4,278,692 | 7/1981 | Cassanelli et al. | 426/96 |
| 4,299,825 | 11/1981 | Lee | 424/180 |
| 4,363,669 | 12/1982 | Cottrell et al. | 106/205 |
| 4,481,222 | 11/1984 | Fan | 426/62 |
| 4,654,086 | 3/1987 | Baird et al. | 106/205 |
| 5,003,060 | 3/1991 | Vinot | 536/114 |
| 5,224,988 | 7/1993 | Pirri et al. | 106/208 |
| 5,270,459 | 12/1993 | Shatzman et al. | 536/114 |

*Primary Examiner*—Nathan M. Nutter
*Attorney, Agent, or Firm*—Andrew M. Solomon

[57] ABSTRACT

A composition comprising a mixture of xanthan gum, a surfactant and a chelating salt, wherein said surfactant is present in an amount of from about 0.1% to about 3.0% by weight of the total weight of the composition, and wherein said chelating salt is present in an amount of from about 0.1% to about 3.0% by weight of the total weight of the composition is provided.

18 Claims, No Drawings

FAST HYDRATING DUST-FREE XANTHAN GUM

BACKGROUND OF THE INVENTION

Xanthan gum is a synthetic, water soluble biopolymer derived from the fermentation of carbohydrates by several bacterial species of the genus Xanthomonas and is useful as a thickening and suspension agent in numerous applications. It is tolerant in both strongly acidic and basic conditions and is also heat stable, thereby being useful in many chemical, pharmaceutical and, in particular food applications such as dairy products, beverages and high protein foods.

Xanthan gum displays poor wettability properties however and is very difficult to disperse in water and/or hydrate. A high degree of shear is usually necessary to wet each gum particle in order to disperse it into solution. It is preferably produced as a dry particle for ease in storage prior to end use application and therefore it would be advantageous to develop a substantially dry, dust-free xanthan gum composition that is readily hydratable when ready for use.

A xanthan gum composition with a fast hydration rate would be advantageous in that it can be mixed far more readily into the final food or pharmaceutical product. Xanthan gum as is presently available must be agglomerated in order to increase the rate of hydration. This method of processing is expensive and necessitates high capital expenditures. A fast hydrating xanthan gum composition such as that of the present invention will lower the costs of manufacture by avoiding these costly agglomeration procedures. Moreover, a dust-free product is advantageous from a health standpoint by reducing air borne particles which may be inhaled by workers in the industry as well as lessening the risk of explosion during storage and the prevention of loss of product during storage and transport. A dust-free product will also lessen the number of accidents caused by slippery conditions resulting from spillage of the product.

Historically, when a fast hydrating dust-free powder is desired, the process that is used to achieve these benefits is agglomeration. However, this process is expensive and therefore increases the cost of the final product. U.S. Pat. No. 4,041,234 to Maske discloses dispersible glyoxal-xanthan gum complexes in which glyoxal is added to the xanthan gum fermentation broth in order to improve its dispersibility. However, high amounts of glyoxal are required to adequately disperse the fermentation product when added to an aqueous solution. This is not only a costly procedure but the glyoxal affects the taste of the final products. U.S. Pat. No. 5,270,459 to Shatzman et al. also uses glyoxal to yield a dispersible xanthan gum product.

U.S. Pat. No. 4,299,825 to Lee discloses concentrated xanthan gum solutions of high viscosity using numerous ultrafiltration steps. However, these comprise only from 8% to 15% xanthan gum and as such exists in solution and is not a dust-free hydratable particle. U.S. Pat. No. 4,670,550 to Bleeker et. al. disclose biopolymer emulsions similar to xanthan gum compositions using high shear techniques, while U.S. Pat. No. 4,254,257 to Schroeck discloses the precipitation of amine salts of xanthan gum from the fermentation broth. U.S. Pat. No. 4,269,974 to Wintersdorff discloses a smooth flowing xanthan composition wherein the gum is homogenized with vegetable oil and water. However, all of these references recognize the need to shear the gum in order to hydrate it.

U.S. Pat. No. 4,218,262 to Warren teaches a non-clumping, delayed action viscosity increasing agent comprised of xanthan gum that is encapsulated with a coating comprised of a fat selected from the group consisting of fatty acids, mono- and diglycerides of fatty acids and a surfactant selected from the group comprising the alkali metal salts of fatty acids, sorbitan fatty acid esters, linear alcohol ethoxylates, sucrose fatty acid esters and mixtures thereof. The surfactant serves to increase the solubility of the coating and promote wetting of the fatty acid onto the particle. The coating itself has a hydrophilic/lipophilic value of 3.0–10.0.

U.S. Pat. No. 4,654,086 to Baird el. al. teaches and claims a dry xanthan gum composition that is allegedly dispersible and hydratable comprising xanthan gum blended with a surfactant such as acetylated monoglycerides, glycerol esters, sorbitan esters and the like. Optionally, sugar is added but the surfactant must be incorporated in amount of at least 5.0% and may be used in amount of up to 20%. The problem that arises however, particularly in food related applications, is that the surfactant possesses an undesirable taste which is discernible at these levels and makes the xanthan gum inappropriate for use in most food products. Below 5%, however Baird et. al. '086 recognizes that problems regarding hydration and dispersibility arise again.

U.S. Pat. No. 5,003,060 discloses solid xanthan gum granules which are produced in a fluidized bed. The resulting materials are porous, having a porosity that typically ranges from about 40 to about 60%.

It is an object of the present invention to provide a substantially dust-free stable xanthan gum hydrocolloid powder that is fully hydratable and useful as a thickener and suspension agent.

It is a further object of the present invention to provide a substantially dust-free, fully hydratable xanthan gum composition comprising xanthan gum and very low amounts of a food grade surfactant and a chelating salt so as to be undetectable in food applications.

It is a further object of the present invention to produce a substantially stable, dense, dust-free xanthan gum composition that is fully hydratable and is an effective thickening and suspension agent in food and drug applications.

SUMMARY OF THE INVENTION

A substantially dust-free, hydratable xanthan gum composition provides excellent thickening and suspension properties when added to food and chemical applications. The xanthan gum is also stabilized and will not require a high degree of shear and/or agitation applied thereto in order to get it to disperse evenly in solution. The composition is comprised of a solid mixture of a xanthan gum polymer, an amount of a surfactant and a chelating salt. The surfactant is preferably selected from the group consisting of food grade emulsifiers with high hydrophilic/lipophilic balance (HLB) values such as sorbitan esters, glycerol esters, mono- and di-glycerides and the like. The preferred chelating salt comprises sodium hexametaphosphate.

DETAILED DESCRIPTION OF THE INVENTION

Whereas there have been prior attempts at producing a hydratable, xanthan gum powder in the prior art, it has not been previously made possible with small amounts of additives and without the need for expensive agglomeration procedures.

More particularly, the present invention is a simple mixture of xanthan gum powder, a surfactant, and chelating salt.

The first component of the mixture comprises xanthan gum powder. Xanthan gum is synthesized using bacteria belonging to the genus Xanthomonas and more particularly to the species described in Bergui's manual of Determinative Bacteriology, 8th edition, Williams and Wilkins Co., Baltimore (1974). Of the different species of Xanthomonas gums which may be used to synthesize the xanthan gum powder of the present invention, the species Xanthomonas campestris is particularly preferred.

The preparation of xanthan gum from a fermentation broth is described in many publications and in many patents. See, for example, U.S. Pat. Nos. 3,020,206; 3,020,207; 3,391,060; and 4,154,654.

Typically, the polysaccharide is isolated from the fermentation broth by evaporation, drying and grinding, or by precipitation with a lower alcohol, separation of the liquid, drying and grinding such as to provide a powder. The commercially available powders have a particle size typically ranging from about 50–250 microns. The apparent density of the xanthan gum used and which results when blending with the surfactant and the chelating salt typically is greater than 0.7 grams/cm$^3$ and usually greater than or equal to about 0.8 grams/cm$^3$. The term "apparent density" is defined in U.S. Pat. No. 5,003,060. To the extent necessary for completion, this document is expressly incorporated by reference.

It has been surprisingly and unexpectedly discovered that by using a specific xanthan gum that is the fermentation product of the species Xanthomonas campestris sold under the tradename Rhodigel® (Rhône-Poulenc Inc., Cranbury, N.J.), a xanthan gum composition can be prepared using only a small amount of surfactant which possesses excellent hydration, thickening and suspension-forming properties.

Without being bound to any theory, whereas xanthan gums of the prior art have globular or ovoid shapes that are smooth surfaced when viewed under a microscope, the xanthan gum which can be employed in the compositions of the present invention displays jagged, rough edges and irregular surfaces. Moreover, although all xanthan gums are characterized chemically as polygalactomannans, the gums useful in the present invention are preferably the sodium salt thereof. These features of the gum may enhance the reaction with the surfactant and result in the composition's surprising and unexpected properties as well as also allow for the use of less surfactant to achieve the stated goals.

The surfactant employed preferably is a food grade emulsifier with a high hydrophilic/lipophilic balance (HLB) value. Such values should range from about 10 to about 16. Suitable emulsifiers preferably have also been approved for use in foods since many of the applications for the present invention reside in the food and drug industries. Preferably, the emulsifier is selected from the group consisting of polyoxyethylene sorbitan esters, sorbitan esters, monoglycerides, diglycerides, lecithin, polyglycerols, sodium stearoyl-2-lactylate, stearyl-2-lactylic acid, polyoxystearates, acetylated monoglycerides and mixtures thereof. Preferably, sorbitan esters and polyoxyethylene sorbitan esters are the emulsifiers of choice.

The surfactant is combined with the xanthan gum polymer in relatively small amounts, i.e. from about 0.1% to about 3.0% of the total weight, of the resulting composition. Preferably, the surfactant will comprise from about 0.1% to about 1.5% by weight of the total weight of the xanthan gum composition mixture.

The third component of the mixture is a chelating salt that will sequester any ions present in the medium in which the xanthan gum is dispersed. Selection of the chelating salt is primarily determined by its ability to sequester the various ions typically present in the dispersing medium. Examples of such chelating salts include phosphate salts such as sodium hexametaphosphate, sodium acid pyrophosphate, tetrasodium pyrophosphate, sodium aluminum phosphate, monocalcium phosphate, sodium tripolyphosphate and EDTA (ethylenediaminetetraacetic acid) and mixtures thereof. Most preferred is the use of sodium hexametaphosphate.

The chelating salt is combined with the xanthan gum polymer and the surfactant in relatively small amounts, i.e. from about 0.1% to about 3.0% of the total weight of the resulting composition. Preferably, the chelating salt will comprise from about 0.5% to about 1.5% by weight of the total weight of the xanthan gum composition.

To produce the inventive composition merely requires the dry blending of the three ingredients. More specifically, the xanthan gum, surfactant and chelating salt are simply placed in a bowl or other simple container and thereafter blended by utilizing an agitation apparatus such as a paddle mixer. For example, substantially complete blending can be achieved by using a paddle mixer at a low speed for approximately 5 minutes. This process is much more simple to perform than suggested prior art processes such as fluidized bed agglomeration, and the like. In addition, dense compositions, having an apparent density of greater than 0.7 grams/cm$^3$ is produced.

The resulting materials demonstrate excellent dissolution properties when hydrated. In addition, the materials do not produce a substantial amount of dust upon settling. Because of their thickening properties and their rheology, the compositions according to the present invention have a variety of applications, including, but not limited to foodstuffs and uses in the building, paint, paper, textile, cosmetic and plant protection chemical industries, in water treatment and in the petroleum industry, for example, in the drilling and the enhanced recovery of oil.

A particularly preferred use for the claimed herein invention is in foodstuffs such as in dry salad dressing mixes. Applicants have surprisingly found that when utilizing the three component mixture and distributing it in a solvent such as water or a food grade oil, the resulting composition easily hydrates and disperses, forming a homogeneous solution. This is in sharp contrast to prior art compositions which can form lumps when distributed in solution. The presence of lumps is an indication that the xanthan gum composition does not adequately dissolve into the solvent. Applicants have surprisingly discovered that the addition of the small amount of surfactant and the small amount of the chelating salt enables the production of a fast dissolving xanthan gum material which, when distributed into solution, does not form undesirable solvent insoluble lumps.

The following examples are disclosed to more specifically describe the embodiments of the present invention. They are for illustrative purposes only however, and should not be construed as limiting the spirit and scope of the invention as recited by the claims that follow.

COMPARATIVE EXAMPLE 1

A xanthan gum composition is prepared by combining 0.75 parts of Polysorbate-60 (polyoxyethylene sorbitan monostearate) with 100 parts of xanthan gum by dry mixing the two compositions in a standard Hobart bowl and using a paddle mixer at low speed for approximately 5 minutes.

To determine the dispersability and lump formation of the blend composition, the following procedure is used. 800 grams of deionized water are weighed into a one liter beaker. This beaker is stirred with a 3 inch single blade spindle set at 100 rpm. A gum slurry is prepared by mixing 8 grams of xanthan gum blend composition in 40 grams of vegetable oil. The gum slurry is added into the water over a 15 second period and the resulting mixture is agitated for a total of 5 minutes at 100 rpm. The temperature conditions of the water, oil, and gum are ambient (between 65° and 80° F.).

The viscosity of the solution is measured using a Brookfield LVT Viscometer, 12 rpm, spindle number 3. The solution is then poured through a U.S. 40 mesh sieve, and cold tap water with a fine spray is run over the sieve until only the lumps that are present from the solution remain. The water is allowed to drain for 5 minutes and at the end of the 5 minute drain period, the water is wiped from the sides of the sieve. Thereafter the lumps (i.e., nondissolved solid particles) that remain on the screen are counted using "large" (greater than ⅛" diameter), "medium" (about ⅛" to 1/16" diameter) and "small" (less than 1/16" diameter) classifications.

At a temperature of 72°, the viscosity of the solution is 5500 cps, and the respective number of lumps are: 2 large, 24 medium, and 27 small The same experiments are conducted with the oil, water and gum at different temperatures. The results of these experiments are shown in Table 1.

TABLE 1

| INGREDIENTS CONDITIONS | | | PHYSICAL EVALUATIONS | | AMOUNT OF LUMPS | | |
|---|---|---|---|---|---|---|---|
| OIL | WATER | GUM | TEMP. °F. | VISCOSITY | LARGE | MEDIUM | SMALL |
| 50° F. | 50° F. | 50° F. | 50° F. | 5700 (cps) | 0 | 8 | 80 |
| 50° F. | 72° F. | 50° F. | 62° F. | 5700 (cps) | 0 | 6 | 16 |
| 50° F. | 50° F. | 72° F. | 50° F. | 5650 (cps) | 0 | 5 | 60 |
| 72° F. | 50° F. | 50° F. | 50° F. | 6350 (cps) | 5 | 25 | 0 |
| 72° F. | 72° F. | 50° F. | 70° F. | 5600 (cps) | 7 | 14 | 15 |
| 72° F. | 50° F. | 72° F. | 50° F. | 5800 (cps) | 0 | 8 | 50 |
| 50° F. | 72° F. | 72° F. | 72° F. | 5600 (cps) | 3 | 35 | 0 |

The same experiment is repeated except one part of silica gel is added to the mixture. The viscosity of the solution at 76° F. is 5000 cps, and the resulting material develops large lumps (5)

EXAMPLE 2

The procedure of comparative Example 1 is repeated except that 0.95 parts of sodium hexametaphosphate are added to the mixing bowl. The viscosity of the solution at 72° F. is 5500 cps, and there are no small, medium or large lumps remaining on the screen.

The same experiments are conducted with the oil, water and gum at different temperatures. The results of these experiments are shown in Table 2.

TABLE 2

| INGREDIENTS CONDITIONS | | | PHYSICAL EVALUATIONS | | AMOUNT OF LUMPS | | |
|---|---|---|---|---|---|---|---|
| OIL | WATER | GUM | TEMP. °F. | VISCOSITY | LARGE | MEDIUM | SMALL |
| 72° F. | 80° F. | 72° F. | 80° F. | 5100 (cps) | 0 | 0 | 0 |
| 72° F. | 70° F. | 72° F. | 69° F. | 5200 (cps) | 0 | 0 | 0 |
| 72° F. | 60° F. | 72° F. | 64° F. | 5100 (cps) | 0 | 0 | Very Few |
| 72° F. | 50° F. | 72° F. | 57° F. | 6100 (cps) | 0 | 0 | 0 |
| 72° F. | 40° F. | 72° F. | 46° F. | 6700 (cps) | 0 | 0 | Very Few |
| 80° F. | 80° F. | 72° F. | 80° F. | 5300 (cps) | 0 | 0 | Very Few |
| 70° F. | 70° F. | 72° F. | 70° F. | 5500 (cps) | 0 | 0 | Very Few |
| 60° F. | 60° F. | 72° F. | 62° F. | 5800 (cps) | 0 | 0 | Very Few |
| 50° F. | 50° F. | 72° F. | 54° F. | 5800 (cps) | 0 | 0 | Very Few |
| 40° F. | 40° F. | 72° F. | 46° F. | 5200 (cps) | 0 | 0 | Very Few |

Having described the invention in detail and by reference to the preferred embodiments thereof, it will be apparent that modifications and variations are possible without departing from the scope of the appended claims.

What is claimed is:

1. A composition comprising a mixture of xanthan gum, a surfactant and a chelating salt, wherein said surfactant is present in an amount of from about 0.1% to about 3.0% by weight of the total weight of the xanthan gum, surfactant and chelating salt, and wherein said chelating salt is present in an amount of from about 0.1% to about 3.0% by weight of the total weight of the xanthan gum, surfactant and chelating salt.

2. The composition of claim 1 wherein said xanthan gum is prepared from a fermentation broth comprising the microorganism *Xanthomonas campestris*.

3. The composition of claim 2 wherein said surfactant is a food grade emulsifier with a high hydrophilic/lipophilic balance value.

4. The composition of claim 3 wherein said hydrophilic/lipophilic value ranges from about 10 to about 16.

5. The composition of claim 4 wherein said surfactant is selected from the group consisting of polyoxyethylene sorbitan esters, sorbitan esters, acetylated monoglycerides, glycerol esters, lecithin, mono- and di-glycerides, sodium steroyl-2-lactylate, polyglycerol esters, propylene glycol esters, stearyl-2-lactylic acid and mixtures thereof.

6. The composition of claim 5 wherein said surfactant is selected from the group consisting of polyoxyethylene sorbitan esters and sorbitan esters.

7. The composition of claim 6 wherein said surfactant is polyoxyethylene sorbitan monostearate.

8. The composition of claim 1 wherein said surfactant is present in an amount of from about 0.1% to about 1.5% by weight of the total weight of the xanthan gum, surfactant and chelating salt.

9. The composition of claim 1 wherein said chelating salt is selected from the group consisting of sodium hexametaphosphate tetrasodium pyrophosphate, sodium acid pyrophosphate, sodium aluminum phosphate, monocalcium phosphate, sodium tripolyphosphate and EDTA and mixtures thereof.

10. The composition of claim 1 wherein said chelating salt is present in an amount of from about 0.1% to about 1.5% by weight of the total weight of the xanthan gum, surfactant and chelating salt.

11. The composition of claim 1 having a specific density of greater than about 0.7 grams per cubic centimeter.

12. A xanthan gum composition comprising a dry mixture of xanthan gum, polyoxyethylene sorbitan monostearate, and sodium hexametaphosphate, wherein said polyoxyethylene sorbitan monostearate is present in an amount of from about 0.1% to about 3.0% by weight of the xanthan gum, polyoxyethylene sorbitan monostearate and sodium hexametaphosphate, and wherein said sodium hexametaphosphate is present in an amount of from about 0.1% to about 3.0% by weight of the xanthan gum, polyoxyethylene sorbitan monostearate and sodium hexametaphosphate.

13. The composition of claim 12 having a specific density of greater than about 0.7 grams per cubic centimeter.

14. Food compositions including a xanthan gum composition wherein said xanthan gum composition comprises a mixture of xanthan gum, a food grade emulsifier, and a chelating salt, wherein said food grade emulsifier and said chelating salt are each present in an amount of from about 0.1% to about 3.0% by weight of the total weight of xanthan gum, food grade emulsifier and chelating salt.

15. The food composition according to claim 14, wherein said food grade emulsifier is selected from the group consisting of polyoxyethylene sorbitan esters, sorbitan esters, acetylated monoglycerides, glycerol esters, lecithin, mono- and di-glycerides, sodium steroyl-2-lactylate, polyglycerol esters, propylene glycol esters, stearly-2-lactylic acid and mixtures thereof.

16. The food composition according to claim 15 wherein said chelating salt is selected from the group consisting of sodium hexametaphosphate, tetrasodium pyrophosphate, sodium acid pyrophosphate, sodium aluminum phosphate, monocalcium phosphate, sodium tripolyphosphate and EDTA and mixtures thereof.

17. The composition according to claim 16, wherein said food grade emulsifier comprises polyoxyethylene sorbitan monostearate and wherein chelating salt comprises sodium hexametaphosphate.

18. The composition according to claim 1, comprising xanthan gum, polyoxyethylene sorbitan monostearate and sodium hexametaphosphate in a weight ratio of approximately 100:0.95:0.95.

* * * * *